(12) United States Patent
Lin et al.

(10) Patent No.: US 11,687,185 B2
(45) Date of Patent: Jun. 27, 2023

(54) TOUCH DISPLAY PANEL

(71) Applicant: HannStar Display Corporation, Taipei (TW)

(72) Inventors: Biing Nan Lin, Taichung (TW); Ya-Wen Lee, Tainan (TW); Hung Ling Hsieh, Tainan (TW); Jen Fu Wu, Tainan (TW)

(73) Assignee: HannStar Display Corporation, Taipei (TW)

( * ) Notice: Subject to any disclaimer, the term of this patent is extended or adjusted under 35 U.S.C. 154(b) by 0 days.

(21) Appl. No.: 17/863,421

(22) Filed: Jul. 13, 2022

(65) Prior Publication Data

US 2023/0036111 A1 Feb. 2, 2023

(30) Foreign Application Priority Data

Aug. 2, 2021 (CN) .......................... 202110888723.X

(51) Int. Cl.
*G06F 3/041* (2006.01)
(52) U.S. Cl.
CPC ........ *G06F 3/0412* (2013.01); *G06F 3/04164* (2019.05)
(58) Field of Classification Search
CPC .................... G06F 3/0412; G06F 3/04164
See application file for complete search history.

(56) References Cited

U.S. PATENT DOCUMENTS

| | | | | |
|---|---|---|---|---|
| 2016/0358525 A1* | 12/2016 | Huang | ................ | G06F 3/0445 |
| 2016/0364068 A1* | 12/2016 | Cheng | ................ | G06F 3/0412 |
| 2018/0329544 A1* | 11/2018 | Yeh | .................... | G06F 3/04164 |
| 2019/0294273 A1* | 9/2019 | Yoshida | ............... | G06F 3/0418 |
| 2021/0201719 A1* | 7/2021 | Lee | ...................... | G09G 3/006 |

* cited by examiner

*Primary Examiner* — Ryan A Lubit
(74) *Attorney, Agent, or Firm* — JCIPRNET

(57) ABSTRACT

A touch display panel, including a pixel circuit substrate, a color filter substrate, and a display medium layer, is provided. The pixel circuit substrate includes pixel structures, data lines, touch sensing electrodes, touch signal lines, and at least one test circuit. Each pixel structure has an active element and a pixel electrode. The data lines are electrically connected to active elements. The touch sensing electrodes are overlapped with pixel electrodes. The touch signal lines are electrically connected to the touch sensing electrodes. The test circuit is electrically connected to at least part of the touch signal lines or the data lines and includes a peripheral line and first and second test pads. The first and second test pads are respectively disposed on a first side and a second side of a display area. The display medium layer is disposed between the pixel circuit substrate and the color filter substrate.

9 Claims, 6 Drawing Sheets

TOUCH DISPLAY PANEL

CROSS-REFERENCE TO RELATED APPLICATION

This application claims the priority benefit of China application serial no. 202110888723.X, filed on Aug. 2, 2021. The entirety of the above-mentioned patent application is hereby incorporated by reference herein and made a part of this specification.

BACKGROUND

Technical Field

The disclosure relates to a display panel, and in particular to a touch display panel.

Description of Related Art

The application of displays is becoming more and more extensive, such as household audio-visual entertainment, information display billboards in public places, displays for e-sports, and mobile electronic products. In recent years, the application of displays in the automotive field or wearable electronic products has gradually expanded, such as vehicle rearview mirrors, vehicle dashboards, and multi-function electronic watches/wristbands. Most of the displays mounted on such electronic devices have touch functions. Since in-cell touch technology facilitates thinness, the in-cell touch technology has gradually become one of the mainstream technologies for touch displays. A technical solution in which a common electrode layer for display is divided into multiple electrode patterns to simultaneously serve as touch sensing electrodes is proposed. Such design allows the display chip and the touch chip of such touch display panel to be integrated, thereby reducing the production cost and increasing the process yield of subsequent modules. However, with the improvement in the resolution of display images, for the touch display panels adopting such solution, when performing the image quality detection of the panel, low grayscale test images are prone to phenomenon such as checkerboard and color shift, which affects the judgment result of the display quality of the panel, thereby causing false detection and affecting the yield of the subsequent process.

SUMMARY

The disclosure provides a touch display panel with better production yield.

According to an embodiment of the disclosure, the touch display panel includes a pixel circuit substrate, a color filter substrate, and a display medium layer. The pixel circuit substrate has a display area and a peripheral area outside the display area. The pixel circuit substrate includes multiple pixel structures, multiple data lines, multiple touch sensing electrodes, multiple touch signal lines, and at least one test circuit. The pixel structures are disposed in the display area, and each has an active element and a pixel electrode electrically connected to each other. The data lines are electrically connected to multiple active elements of the pixel structures. The touch sensing electrodes are disposed in the display area, are overlapped with multiple pixel electrodes of the pixel structures, and are structurally separated from each other. The touch signal lines are electrically connected to the touch sensing electrodes. The at least one test circuit is disposed in the peripheral area and is electrically connected to at least part of the touch signal lines or the data lines. The test circuit includes a peripheral line, a first test pad, and a second test pad. The peripheral line extends from a first side of the display area to a second side of the display area. The first side is opposite to the second side. The first test pad and the second test pad are respectively disposed on the first side and the second side of the display area and are electrically connected to the peripheral line. The color filter substrate is disposed opposite to the pixel circuit substrate. The display medium layer is disposed between the pixel circuit substrate and the color filter substrate.

In the touch display panel according to the embodiment of the disclosure, the touch sensing electrodes are arranged into q touch electrode strings in a first direction. The at least one test circuit is m test circuits electrically insulated from each other. Each touch electrode string is electrically connected to the m test circuits, where m and q are positive integers greater than 1.

In the touch display panel according to the embodiment of the disclosure, each touch electrode string has p touch sensing electrodes, and the p touch sensing electrodes are respectively electrically connected to the m test circuits, where p is a positive integer greater than 1.

In the touch display panel according to the embodiment of the disclosure, each of the m test circuits further includes n test pads, which are disposed between the first test pad and the second test pad and are electrically connected to the peripheral line, where n is positive integer.

In the touch display panel according to the embodiment of the disclosure, the test circuit further includes n test pads, which are disposed between the first test pad and the second test pad and are electrically connected to the peripheral line, where n is a positive integer.

In the touch display panel according to the embodiment of the disclosure, the touch sensing electrodes are arranged into multiple touch electrode strings in a direction perpendicular to an arrangement direction of the first test pad, the second test pad, and the n test pads. The touch electrode strings are electrically connected to the peripheral line, and the n test pads and the touch electrode strings are alternately arranged in the arrangement direction.

In the touch display panel according to the embodiment of the disclosure, the pixel structures include multiple first pixel structures, multiple second pixel structures, and multiple third pixel structures alternately arranged in a first direction. The data lines include multiple first data lines electrically connected to the first pixel structures, multiple second data lines electrically connected to the second pixel structures, and multiple third data lines electrically connected to the third pixel structures. The at least one test circuit includes a first test circuit, a second test circuit, and a third test circuit electrically insulated from each other. The first test circuit is electrically connected to the first data lines. The second test circuit is electrically connected to the second data lines. The third test circuit is electrically connected to the third data lines. The first side and the second side of the display area are two opposite sides of the display area in the first direction, and the first pixel structure, the second pixel structure, and the third pixel structure are respectively configured to display different colors.

In the touch display panel according to the embodiment of the disclosure, each of at least one of the first test circuit, the second test circuit, and the third test circuit further includes n test pads, which are disposed between the first test pad and the second test pad and are electrically connected to the peripheral line, where n is a positive integer.

In the touch display panel according to the embodiment of the disclosure, the touch sensing electrodes are arranged into multiple first touch electrode strings and multiple second touch electrode strings in a first direction. The first touch electrode strings and the second touch electrode strings are alternately arranged in the first direction. The at least one test circuit further includes a fourth test circuit and a fifth test circuit electrically insulated from each other. The first touch electrode strings are electrically connected to the fourth test circuit. The second touch electrode strings are electrically connected to the fifth test circuit.

In the touch display panel according to the embodiment of the disclosure, each of the fourth test circuit and the fifth test circuit further includes n test pads, which are disposed between the first test pad and the second test pad and are electrically connected to the peripheral line, where n is a positive integer.

Based on the above, in the touch display panel of the embodiment of the disclosure, the test circuit located in the peripheral area is electrically connected to at least part of the touch signal lines or the data lines in the display area via the peripheral line. Through disposing the first test pad and the second test pad electrically connected to the peripheral line on the two opposite sides of the display area, the test signals may be prevented from attenuating as the transmission path becomes longer, thereby improving the issue of any unexpected pattern or/and color shift appearing in a detection image, which helps to improve the production yield of the touch display panel.

DETAILED DESCRIPTION OF DISCLOSED EMBODIMENTS

Figure 1:
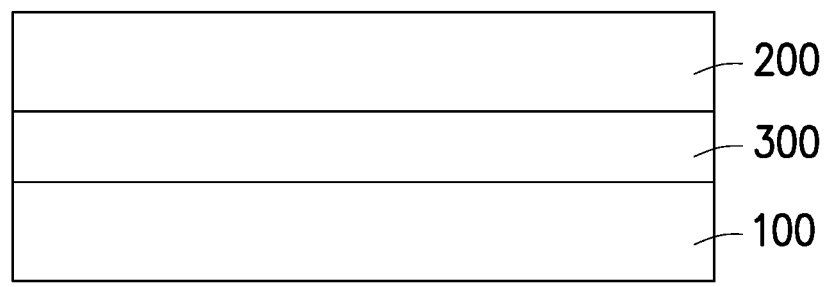
FIG. 1 is a cross-sectional schematic view of a touch display panel of a first embodiment of the disclosure.

Reference will now be made in detail to the exemplary embodiments of the disclosure, and examples of the exemplary embodiments are illustrated in the accompanying drawings. Whenever possible, the same reference numerals are used in the drawings and description to indicate the same or similar parts.

Figure 2:
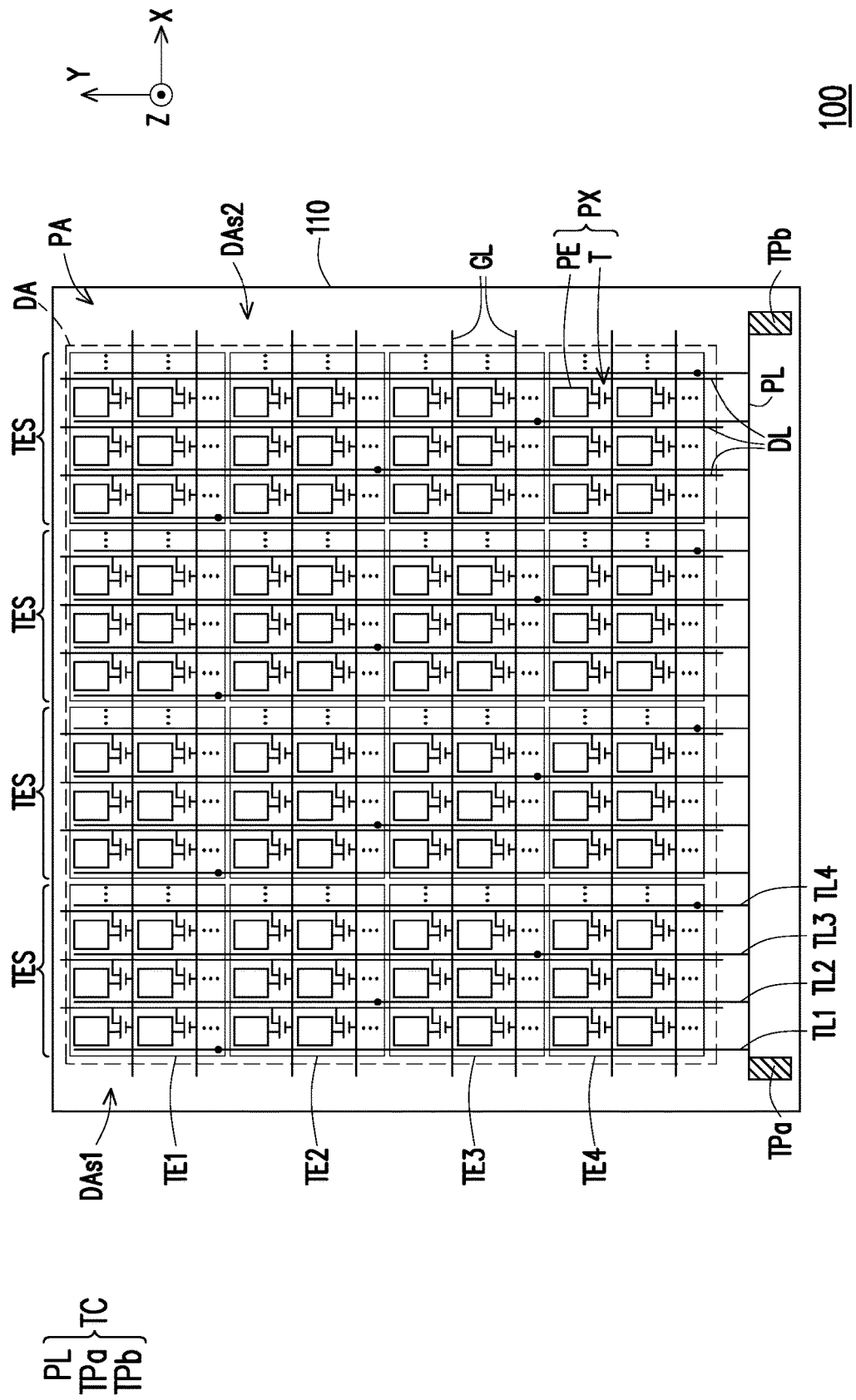
FIG. 2 is a top schematic view of a pixel circuit substrate of FIG. 1.

FIG. 1 is a cross-sectional schematic view of a touch display panel of a first embodiment of the disclosure. FIG. 2 is a top schematic view of a pixel circuit substrate of FIG. 1. Please refer to FIG. 1 and FIG. 2. A touch display panel 10 includes a pixel circuit substrate 100, a color filter substrate 200, and a display medium layer 300. The color filter substrate 200 is disposed opposite to the pixel circuit substrate 100, and the display medium layer 300 is disposed between the pixel circuit substrate 100 and the color filter substrate 200. For example, in the embodiment, the color filter substrate 200 may include a light shielding pattern layer (not shown) and a filter pattern layer (not shown). The light shielding pattern layer has multiple openings, and the openings may define multiple pixel areas of the touch display panel 10. The filter pattern layer may include various filter patterns. The filter patterns are respectively disposed overlapping in the pixel areas and are suitable for allowing light with different colors (or wavelengths) to pass through, so that the touch display panel 10 has a color display effect.

The display medium layer 300 is, for example, a liquid crystal layer, and multiple liquid crystal molecules in the liquid crystal layer are, for example, operated in twist deformation (TN), vertical alignment (VA), in-plane switching (IPS), optically compensated birefringence (OCB), electrically controlled birefringence (ECB), or other suitable liquid crystal modes, which is not limited by the disclosure.

The pixel circuit substrate 100 has a display area DA and a peripheral area PA other than the display area DA. The pixel circuit substrate 100 includes a substrate 110, multiple pixel structures PX, multiple data lines DL, and multiple scan lines GL. For example, the data lines DL may be arranged on the substrate 110 along a direction X and extend in a direction Y, and the scan lines GL may be arranged on the substrate 110 along the direction Y and extend in the direction X, wherein the direction X is optionally perpendicular to the direction Y, but not limited thereto. The pixel structures PX may be respectively disposed in the pixel areas (not shown) and are respectively electrically connected to the corresponding data line DL and the corresponding scan line GL. More specifically, the pixel structure PX includes an active element T and a pixel electrode PE electrically connected to each other, wherein the active element T is electrically connected between the pixel electrode PE and the data line DL (or the scan line GL).

Furthermore, the pixel circuit substrate 100 further includes multiple touch sensing electrodes and multiple touch signal lines. The touch sensing electrodes that are structurally separated from each other are respectively electrically connected to the corresponding touch signal line and are overlapped with the pixel electrodes PE of the pixel structures PX in a normal direction (for example, a direction Z) on the surface of the substrate 110. In the embodiment, the touch sensing electrodes have different functions during different operating times. For example, during a touch time, the touch sensing electrodes serve as the touch sensing electrodes; and during a display time, the touch sensing electrodes may also serve as common electrodes of display pixels.

For example, in the embodiment, the touch sensing electrodes may be arranged into four touch electrode strings TES along the direction X, and the number of touch sensing electrodes of each touch electrode string TES is four, which are respectively a touch sensing electrode TE1, a touch sensing electrode TE2, a touch sensing electrode TE3, and a touch sensing electrode TE4, but not limited thereto. The four touch sensing electrodes are arranged on the substrate 110 along the direction Y and are respectively electrically connected to a touch signal line TL1, a touch signal line TL2, a touch signal line TL3, and a touch signal line TL4. It should be noted that in the embodiment, the number of touch sensing electrodes is illustratively exemplified by sixteen, which does not mean that the disclosure is limited by the content disclosed in the drawings. In other embodiments, the number of touch sensing electrodes configured on the touch display panel in a horizontal direction or a vertical direction may be adjusted according to different product requirements. For example, the touch sensing electrodes may be arranged into q touch electrode strings TES along the direction X, and each touch electrode string TES has p touch sensing electrodes, where p and q are positive integers greater than 1.

Generally speaking, before bonding the touch display panel and a driving circuit substrate, the image quality of the touch display panel is detected to eliminate any display abnormality of the touch display panel before proceeding with a subsequent assembly process to avoid causing unnecessary cost loss. Therefore, the touch display panel further includes a test circuit disposed in the peripheral area PA and configured to generate a detection image. In the embodiment, a test circuit TC of the pixel circuit substrate 100 is optionally electrically connected to the touch signal lines. In detail, the test circuit TC includes a peripheral line PL and two test pads TPa and TPb. The peripheral line PL extends from a first side DAs1 of the display area DA to a second side DAs2 of the display area and is electrically connected to the touch signal lines. Here, the first side DAs1 and the second side DAs2 are, for example, two opposite sides of the display area DA in the direction X, but not limited thereto.

It should be noted that the two test pads TPa and TPb of the test circuit TC are respectively disposed on the first side DAs1 and the second side DAs2 of the display area DA and are electrically connected to two opposite end portions of the peripheral line PL. Accordingly, a detection machine may transmit test signals from the two opposite sides (for example, the left and right sides of FIG. 2) of the display area DA to the touch sensing electrodes via the two test pads TPa and TPb to prevent the test signals from attenuating as the transmission path becomes longer, thereby improving the issue of any unexpected pattern or/and color shift appearing in the detection image. In other words, the detection accuracy rate of the display quality can be increased, thereby improving the overall yield of the touch display panel 10 in the subsequent assembly process.

Other embodiments will be listed below to describe the disclosure in detail, wherein the same components will be marked with the same reference numerals, and the description of the same technical content will be omitted. For the omitted parts, please refer to the above embodiment, which will not be repeated.

Figure 3:
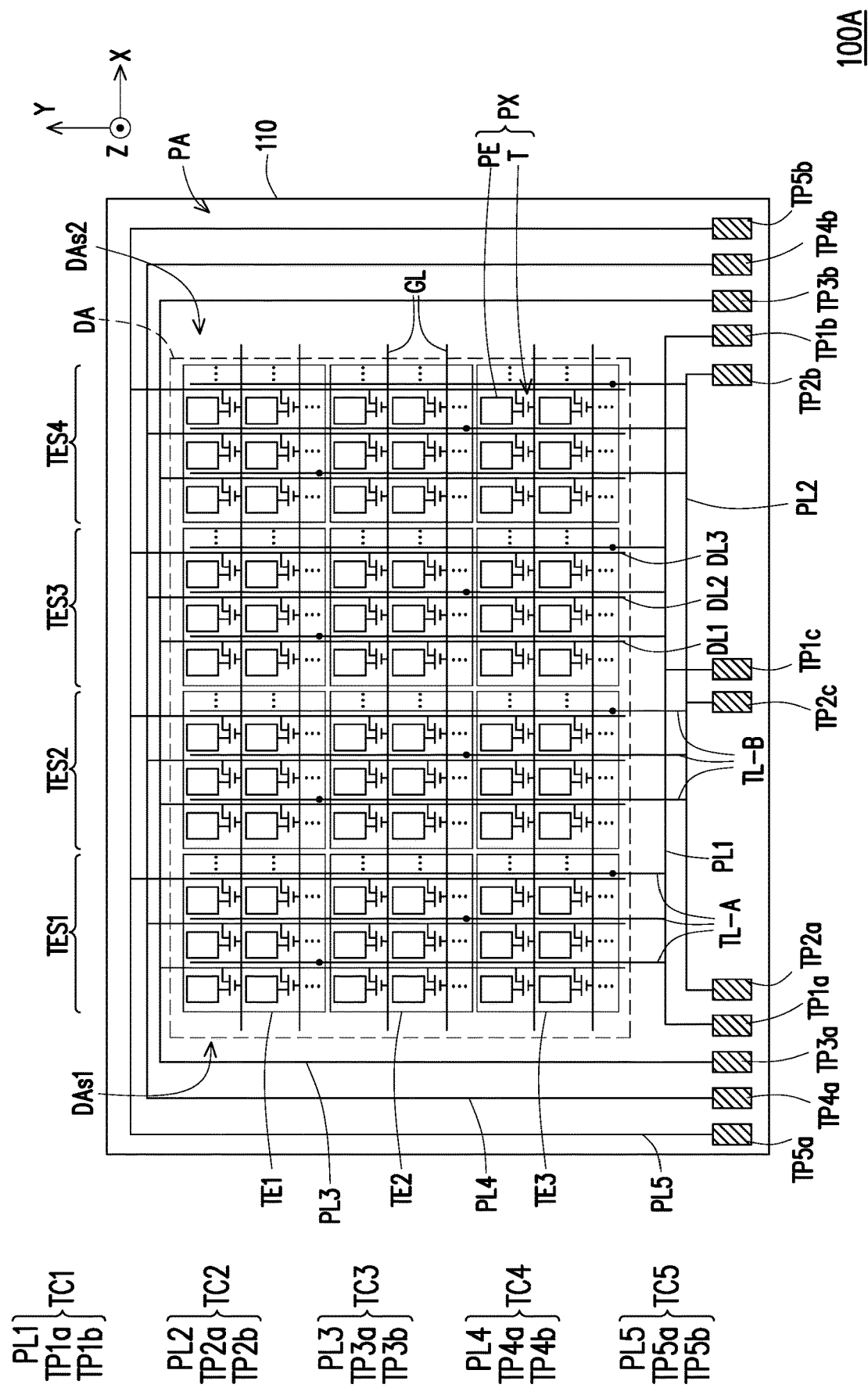
FIG. 3 is a top schematic view of a touch display panel of a second embodiment of the disclosure.

FIG. 3 is a top schematic view of a touch display panel of a second embodiment of the disclosure. Please refer to FIG. 3. The main difference between a pixel circuit substrate 100A of the embodiment and the pixel circuit substrate 100 of FIG. 2 is that: the number of test circuits is different. In the embodiment, the pixel circuit substrate 100A is provided with five test circuits, which are respectively a test circuit TC1, a test circuit TC2, a test circuit TC3, a test circuit TC4, and a test circuit TCS. The test circuit TC1 and the test circuit TC2 are electrically connected to multiple touch signals, and the test circuit TC3, the test circuit TC4, and the test circuit TC5 are electrically connected to multiple data lines.

In the embodiment, multiple touch sensing electrodes may be arranged into a first touch electrode string TES1, a second touch electrode string TES2, a third touch electrode string TES3, and a fourth touch electrode string TES4, and the touch electrode strings may be arranged on the substrate 110 along the direction X. It should be noted that multiple touch signal lines TL-A electrically connected to the first touch electrode string TES1 and the third touch electrode string TES3 are electrically connected to a peripheral line PL1 of the test circuit TC1, and multiple touch signal lines TL-B electrically connected to the second touch electrode string TES2 and the fourth touch electrode string TES4 are electrically connected to a peripheral line PL2 of the test circuit TC2. Two opposite end portions of the peripheral line PL1 of the test circuit TC1 are respectively provided with two test pads TP1a, TP1b and TP1c. Similarly, two opposite end portions of the peripheral line PL2 of the test circuit TC2 are respectively provided with two test pads TP2a, TP2b and TP2c.

On the other hand, in the embodiment, the data lines may include multiple first data lines DL1, multiple second data lines DL2, and multiple third data lines DL3, and the first data lines DL1, the second data lines DL2, and the third data lines DL3 are alternately arranged in the direction X. For example, in the embodiment, the pixel structure PX electrically connected to the first data line DL1 is suitable for displaying red, the pixel structure PX electrically connected to the second data line DL2 is suitable for displaying green, and the pixel structure PX electrically connected to the third data line DL3 is suitable for displaying blue, but not limited thereto.

The first data lines DL1 may be electrically connected to a peripheral line PL3 of the test circuit TC3, the second data lines DL2 may be electrically connected to a peripheral line PL4 of the test circuit TC4, and the third data lines DL3 may be electrically connected to a peripheral line PL5 of the test circuit TCS. The peripheral line PL3, the peripheral line PL4, and the peripheral line PL5 respectively extend from the first side DAs1 of the display area DA to the second side DAs2 of the display area DA, and respective two end portions are respectively provided with two test pads. More specifically, the two opposite end portions of the test circuit TC3 are provided with test pads TP3a and TP3b, the two opposite end portions of the test circuit TC4 are provided with test pads TP4a and TP4b, and the two opposite end portions of the test circuit TC5 are provided with test pads TP5a and TP5b.

The two test pads are disposed on the two opposite end portions of the peripheral line of each of the test circuits, and the detection machine transmits the corresponding test signals from the two opposite sides (for example, the left and right sides of FIG. 3) of the display area DA to the touch sensing electrodes or the pixel structures PX via the two test pads, the test signals may be prevented from attenuating as the transmission path becomes longer, thereby improving the issue of any unexpected pattern or/and color shift appearing in the detection image.

It should be noted that in the embodiment, the number of test circuits electrically connected to the touch electrode strings is illustratively exemplified by two, which does not mean that the disclosure is limited by the content disclosed in the drawings. For example, in other embodiments, the pixel circuit substrate may have m test circuits, and the touch electrode strings are electrically connected to the m test circuits, where m is a positive integer greater than 2.

Figure 4:
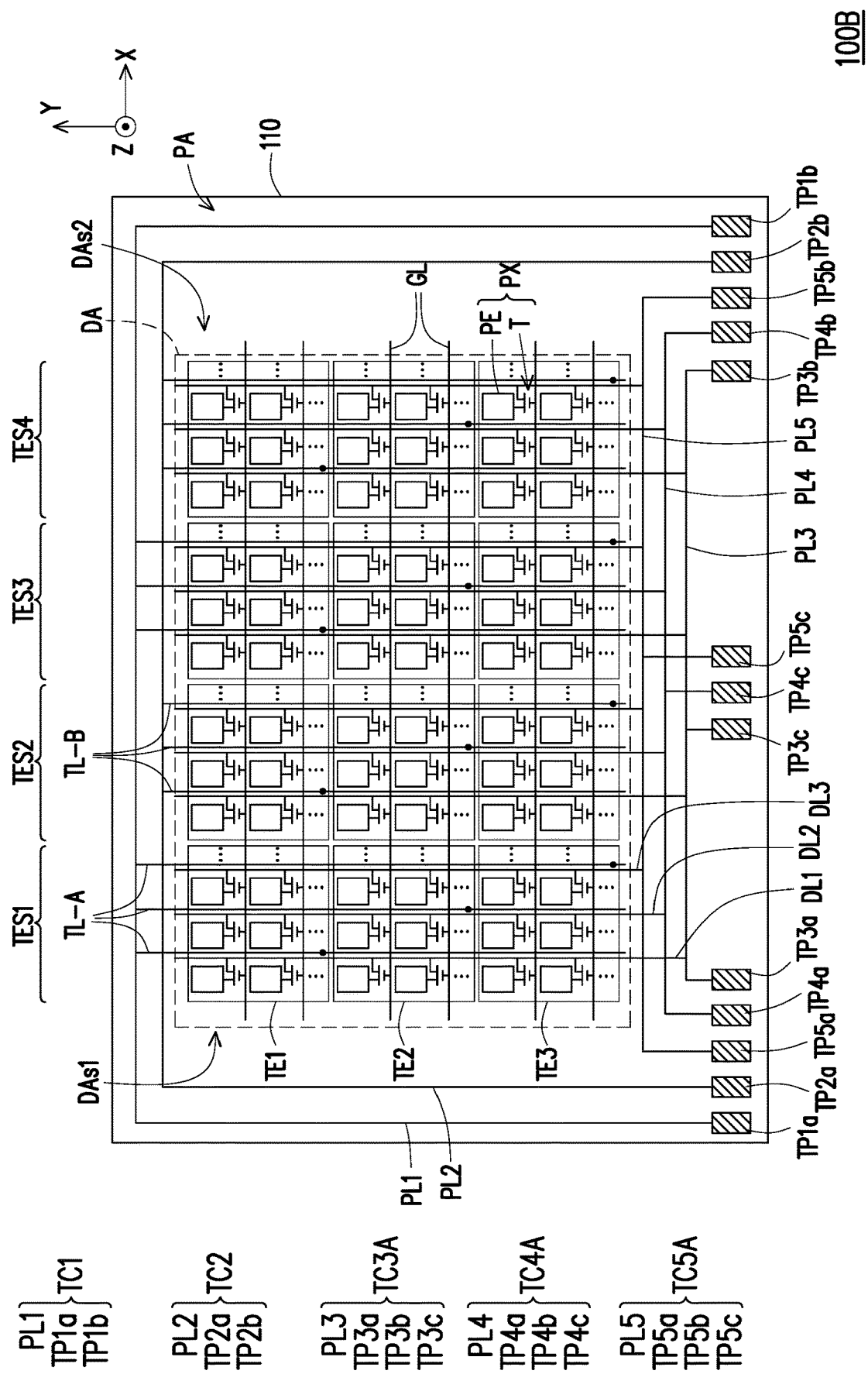
FIG. 4 is a top schematic view of a touch display panel of a third embodiment of the disclosure.

FIG. 4 is a top schematic view of a touch display panel of a third embodiment of the disclosure. Please refer to FIG. 4. The main difference between a pixel circuit substrate 100B of the embodiment and the pixel circuit substrate 100A of FIG. 3 is that: the number of test pads of the test circuits electrically connected to the pixel structures PX (or the data lines) is different. In the embodiment, a test circuit TC3A electrically connected to the first data lines DL1 has three test pads TP3a, TP3b, and TP3c, a test circuit TC4A electrically connected to the second data lines DL2 has three test pads TP4a, TP4b, and TP4c, and a test circuit TCSA electrically connected to the third data lines DL3 has three test pads TP5a, TP5b, and TP5c.

Therefore, the detection machine may transmit corresponding test signals from the middle of the display area DA and the two opposite sides of the display area DA to the pixel structures PX via the three test pads to further prevent the test signals from attenuating as the transmission path becomes longer, thereby improving the issue of any unexpected pattern or/and color shift appearing in the detection image. It should be understood that the disclosure does not limit the number of test pads connected to each test circuit. For example, in other embodiments, the test circuit may have n test pads, where n is a positive integer greater than 1 and not equal to 3.

Specifically, in the pixel circuit substrate 100A shown in FIG. 3, the test circuits connected to the touch electrode strings, such as the test circuit TC1 and the test circuit TC2, may also be provided with three test pads similar to the configuration of the test circuit TC3A, the test circuit TC4A, and the test circuit TC5A of the embodiment, and the three test pads are evenly distributed on an extension path of a corresponding peripheral line to shorten the length of the path for transmitting test signals from the detection machine to the touch electrode strings.

Figure 5:
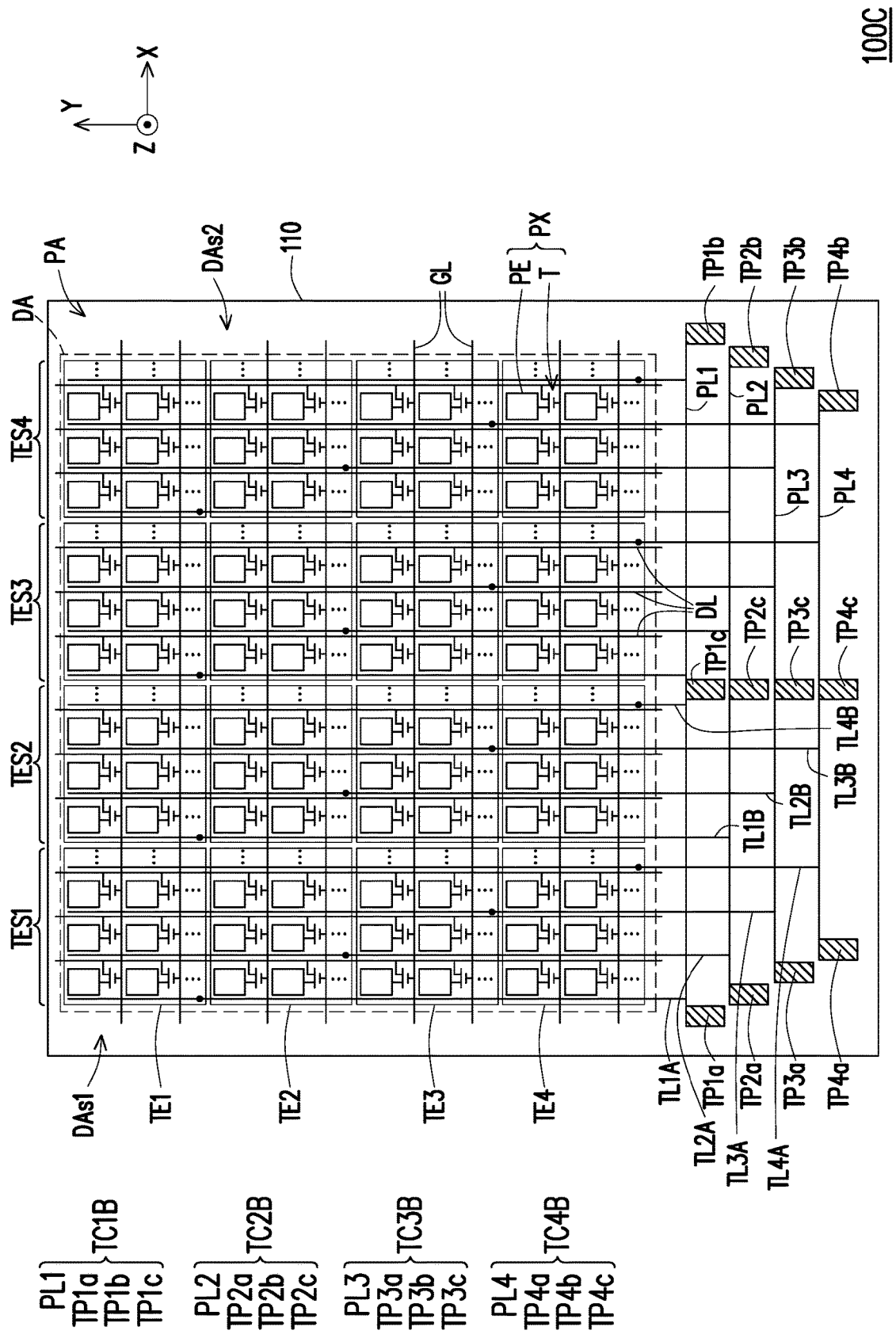
FIG. 5 is a top schematic view of a touch display panel of a fourth embodiment of the disclosure.

FIG. 5 is a top schematic view of a touch display panel of a fourth embodiment of the disclosure. Please refer to FIG. 5. The main difference between a pixel circuit substrate 100C of the embodiment and the pixel circuit substrate 100 of FIG. 2 is that: the number of test circuits electrically connected to multiple touch electrode strings is different, and the number of test pads of each test circuit is also different. In the embodiment, the number of test circuits electrically connected to the touch electrode strings is four, which are, for example, a test circuit TC1B, a test circuit TC2B, a test circuit TC3B, and a test circuit TC4B.

It is particularly noted that each test circuit is electrically connected to one of the touch sensing electrodes of each of the touch electrode strings. For example, the test circuit TC1B is electrically connected to the touch sensing electrode TE1 of the first touch electrode string TES1, the touch sensing electrode TE4 of the second touch electrode string TES2, the touch sensing electrode TE1 of the third touch electrode string TES3, and the touch sensing electrode TE4 of the fourth touch electrode string TES4 respectively via multiple touch signal lines TL1A and multiple touch signal lines TL4B. The test circuit TC2B is electrically connected to the touch sensing electrode TE2 of the first touch electrode string TES1, the touch sensing electrode TE1 of the second touch electrode string TES2, the touch sensing electrode TE2 of the third touch electrode string TES3, and the touch sensing electrode TE1 of the fourth touch electrode string TES4 respectively via multiple touch signal lines TL2A and multiple touch signal lines TL1B. The test circuit TC3B is electrically connected to the touch sensing electrode TE3 of the first touch electrode string TES1, the touch sensing electrode TE2 of the second touch electrode string TES2, the touch sensing electrode TE3 of the third touch electrode string TES3, and the touch sensing electrode TE2 of the fourth touch electrode string TES4 respectively via multiple touch signal lines TL3A and multiple touch signal lines TL2B. The test circuit TC4B is electrically connected to the touch sensing electrode TE4 of the first touch electrode string TES1, the touch sensing electrode TE3 of the second touch electrode string TES2, the touch sensing electrode TE4 of the third touch electrode string TES3, and the touch sensing electrode TE3 of the fourth touch electrode string TES4 respectively via multiple touch signal lines TL4A and multiple touch signal lines TL3B.

In other words, in the embodiment, the number of touch sensing electrodes of each touch electrode string connected to each test circuit is one. Therefore, it can be known that each touch electrode string has four touch sensing electrodes through the configured number of the test circuits. However, the disclosure is not limited thereto. According to other embodiments, the number of touch sensing electrodes of each touch electrode string may also be q, where q is a positive integer not equal to 4.

Furthermore, in the embodiment, the number of test pads configured for each test circuit is three, and the test pads are respectively connected to two opposite end portions of a peripheral line thereof and a middle portion of the peripheral line. Here, the middle portion of the peripheral line refers to a portion where the peripheral line is roughly aligned with the middle of the display area DA in the direction Y, and the two end portions of the peripheral line are roughly aligned with the two opposite sides of the display area DA in the direction Y. Compared with the test circuit TC shown in FIG. 2, the test circuit of the embodiment also has test pads disposed in the middle portion of the peripheral line, such as a test pad TP1c of the test circuit TC1B, a test pad TP2c of the test circuit TC2B, a test pad TP3c of the test circuit TC3B, and a test pad TP4c of the test circuit TC4B. Accordingly, it is possible to further prevent test signals from attenuating as the transmission path becomes longer during the process of transmitting the test signals to the touch sensing electrodes (that is, common electrodes during the display time), thereby improving the issue of any unexpected pattern or/and color shift appearing in the detection image.

It should be understood that the disclosure does not limit the number of test pads connected to each test circuit. For example, in other embodiments, the test circuit may have n test pads, where n is a positive integer greater than 1 and not equal to 3.

Figure 6:
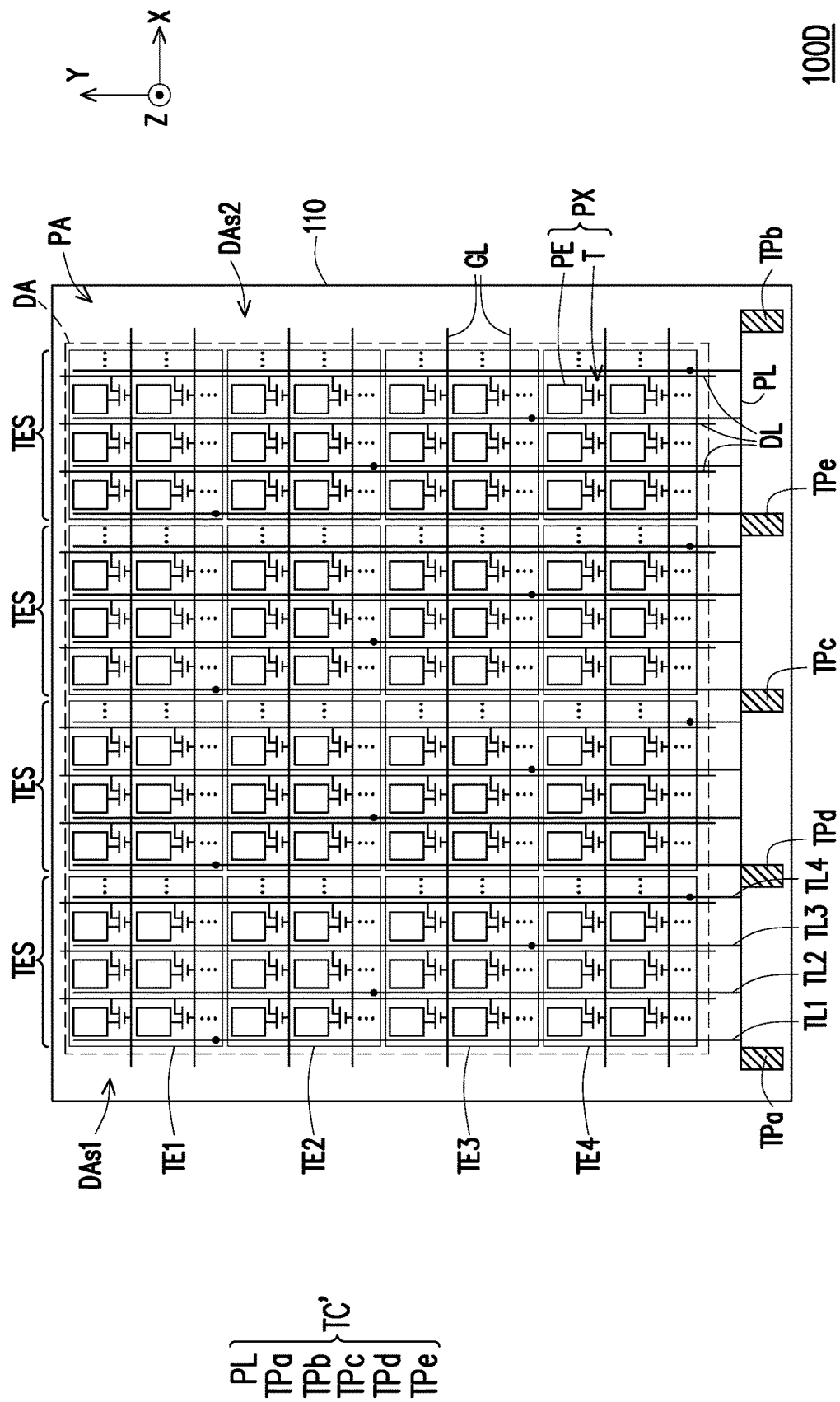
FIG. 6 is a top schematic view of a touch display panel of a fifth embodiment of the disclosure.

FIG. 6 is a top schematic view of a touch display panel of a fifth embodiment of the disclosure. Please refer to FIG. 6. The difference between a pixel circuit substrate 100D of the embodiment and the pixel circuit substrate 100 of FIG. 2 is that: the number of test pads of the test circuit is different. In order to further improve the attenuation of test signals as the transmission path becomes longer, a test circuit TC' of the embodiment is provided with five test pads, which are respectively the test pad TPa, the test pad TPb, a test pad TPc, a test pad TPd, and a test pad TPe, and the placements of the test pads are roughly evenly distributed on the extension path of the peripheral line PL. For example, the test pads and the touch electrode strings TES are alternately arranged in the arrangement direction (for example, the direction X) of the touch electrode strings TES. Therefore, through evenly distributing the test pads within a width range of the display area DA, the transmission path of the test signals may be effectively shortened, thereby improving the consistency of the display effect of different regions in the display area DA. It should be understood that the disclosure does not limit the number of test pads connected to each test circuit. For example, in other embodiments, the test circuit may have n test pads, where n is a positive integer greater than 1 and not equal to 5.

As described above, in the touch display panel of the embodiment of the disclosure, the test circuit located in the peripheral area is electrically connected to at least part of the touch signal lines or the data lines in the display area via the peripheral line. Through disposing the first test pad and the second test pad electrically connected to the peripheral line on the two opposite sides of the display area, the test signals may be prevented from attenuating as the transmission path becomes longer, thereby improving the issue of any unexpected pattern or/and color shift appearing in the detection image, which helps to improve the production yield of the touch display panel.

Finally, it should be noted that the above embodiments are only used to illustrate but not to limit the technical solutions of the disclosure. Although the disclosure has been described in detail with reference to the above embodiments, persons skilled in the art should understand that they may still modify the technical solutions described in the above embodiments or equivalently replace some or all of the technical features. However, the modifications or replacements do not cause the essence of the corresponding technical solutions to deviate from the scope of the technical solutions of the embodiments of the disclosure.

What is claimed is:

1. A touch display panel, comprising:
    a pixel circuit substrate, having a display area and a peripheral area outside the display area, wherein the pixel circuit substrate comprises:
        a plurality of pixel structures, disposed in the display area, wherein each of the plurality of pixel structures has an active element and a pixel electrode electrically connected to each other;
        a plurality of data lines, electrically connected to a plurality of active elements of the plurality of pixel structures;
        a plurality of touch sensing electrodes, disposed in the display area, overlapped with a plurality of pixel electrodes of the plurality of pixel structures, and separated from each other;
        a plurality of touch signal lines, electrically connected to the plurality of touch sensing electrodes; and
        at least one test circuit, disposed in the peripheral area and electrically connected to at least part of the plurality of touch signal lines or the plurality of data lines, wherein the test circuit comprises:
            a peripheral line, extending from a first side of the display area to a second side of the display area, wherein the first side is opposite to the second side; and
            a first test pad and a second test pad, respectively disposed on the first side and the second side of the display area and electrically connected to the peripheral line,
    wherein the test circuit further comprises n test pads, disposed between the first test pad and the second test pad and electrically connected to the peripheral line, where n is a positive integer;
    a color filter substrate, disposed opposite to the pixel circuit substrate; and
    a display medium layer, disposed between the pixel circuit substrate and the color filter substrate.

2. The touch display panel according to claim 1, the plurality of touch sensing electrodes are arranged into q touch electrode strings in a first direction, the at least one test circuit are m test circuits electrically insulated from each other, and each of the q touch electrode strings is electrically connected to the m test circuits, where m and q are positive integers greater than 1.

3. The touch display panel according to claim 2, wherein each of the q touch electrode strings has p touch sensing electrodes, and the p touch sensing electrodes are respectively electrically connected to the m test circuits, where p is a positive integer greater than 1.

4. The touch display panel according to claim 1, wherein the plurality of touch sensing electrodes are arranged into a plurality of touch electrodes strings in a direction perpendicular to an arrangement direction of the first test pad, the second test pad and n test pads, the plurality of touch electrode strings are electrically connected to the peripheral line, and the n test pads and the plurality of touch electrode strings are alternately arranged in the arrangement direction.

5. A touch display panel comprising:
    a pixel circuit substrate, having a display area and a peripheral area outside the display area, wherein the pixel circuit substrate comprises:
        a plurality of pixel structures, disposed in the display area, wherein each of the plurality of pixel structures has an active element and a pixel electrode electrically connected to each other;
        a plurality of data lines, electrically connected to a plurality of active elements of the plurality of pixel structures;
        a plurality of touch sensing electrodes, disposed in the display area, overlapped with a plurality of pixel electrodes of the plurality of pixel structures, and separated from each other;
        a plurality of touch signal lines, electrically connected to the plurality of touch sensing electrodes; and
        at least one test circuit, disposed in the peripheral area and electrically connected to at least part of the plurality of touch signal lines or the plurality of data lines, wherein the test circuit comprises:
            a peripheral line, extending from a first side of the display area to a second side of the display area, wherein the first side is opposite to the second side; and
            a first test pad and a second test pad, respectively disposed on the first side and the second side of the display area and electrically connected to the peripheral line;
    a color filter substrate, disposed opposite to the pixel circuit substrate; and
    a display medium layer, disposed between the pixel circuit substrate and the color filter substrate, wherein the plurality of touch sensing electrodes are arranged into q touch electrode strings in a first direction, the at least one test circuit are m test circuits electrically insulated from each other, and each of the q touch electrode strings is electrically connected to the m test circuits, where m and q are positive integers greater than 1, and each of the m test circuits further comprises n test pads, disposed between the first test pad and the second test pad and electrically connected to the peripheral line, where n is a positive integer.

6. A touch display panel comprising:
    a pixel circuit substrate, having a display area and a peripheral area outside the display area, wherein the pixel circuit substrate comprises:
        a plurality of pixel structures, disposed in the display area, wherein each of the plurality of pixel structures has an active element and a pixel electrode electrically connected to each other;
        a plurality of data lines, electrically connected to a plurality of active elements of the plurality of pixel structures;
        a plurality of touch sensing electrodes, disposed in the display area, overlapped with a plurality of pixel electrodes of the plurality of pixel structures, and separated from each other;
        a plurality of touch signal lines, electrically connected to the plurality of touch sensing electrodes; and
        at least one test circuit, disposed in the peripheral area and electrically connected to at least part of the plurality of touch signal lines or the plurality of data lines, wherein the test circuit comprises:
a peripheral line, extending from a first side of the display area to a second side of the display area, wherein the first side is opposite to the second side; and
a first test pad and a second test pad, respectively disposed on the first side and the second side of the display area and electrically connected to the peripheral line;
a color filter substrate, disposed opposite to the pixel circuit substrate; and
a display medium layer, disposed between the pixel circuit substrate and the color filter substrate, wherein the plurality of pixel structures comprise a plurality of first pixel structures, a plurality of second pixel structures, and a plurality of third pixel structures alternately arranged in a first direction, the plurality of data lines comprise a plurality of first data lines electrically connected to the plurality of first pixel structures, a plurality of second data lines electrically connected to the plurality of second pixel structures, and a plurality of third data lines electrically connected to the plurality of third pixel structures, the at least one test circuit comprises a first test circuit, a second test circuit, and a third test circuit electrically insulated from each other, the first test circuit is electrically connected to the plurality of first data lines, the second test circuit is electrically connected to the plurality of second data lines, and the third test circuit is electrically connected to the plurality of third data lines, wherein the first side and the second side of the display area are two opposite sides of the display area in the first direction, and the first pixel structure, the second pixel structure, and the third pixel structure are respectively configured to display different colors.

7. The touch display panel according to claim 6, wherein each of at least one of the first test circuit, the second test circuit, and the third test circuit further comprises:
n test pads, disposed between the first test pad and the second test pad and electrically connected to the peripheral line, where n is a positive integer.

8. The touch display panel according to claim 6, wherein the plurality of touch sensing electrodes are arranged into a plurality of first touch electrode strings and a plurality of second touch electrode strings in a first direction, the plurality of first touch electrode strings and the plurality of second touch electrode strings are alternately arranged in the first direction, the at least one test circuit further comprises a fourth test circuit and a fifth test circuit electrically insulated from each other, the plurality of first touch electrode strings are electrically connected to the fourth test circuit, and the plurality of second touch electrode strings are electrically connected to the fifth test circuit.

9. The touch display panel according to claim 8, wherein each of the fourth test circuit and the fifth test circuit further comprises:
n test pads, disposed between the first test pad and the second test pad and electrically connected to the peripheral line, where n is a positive integer.

* * * * *